Oct. 3, 1933.  A. J. DE BIASI  1,928,995
COMBINED HOLDER FOR PAN COVERS AND OTHER CULINARY ARTICLES
Filed May 24, 1932
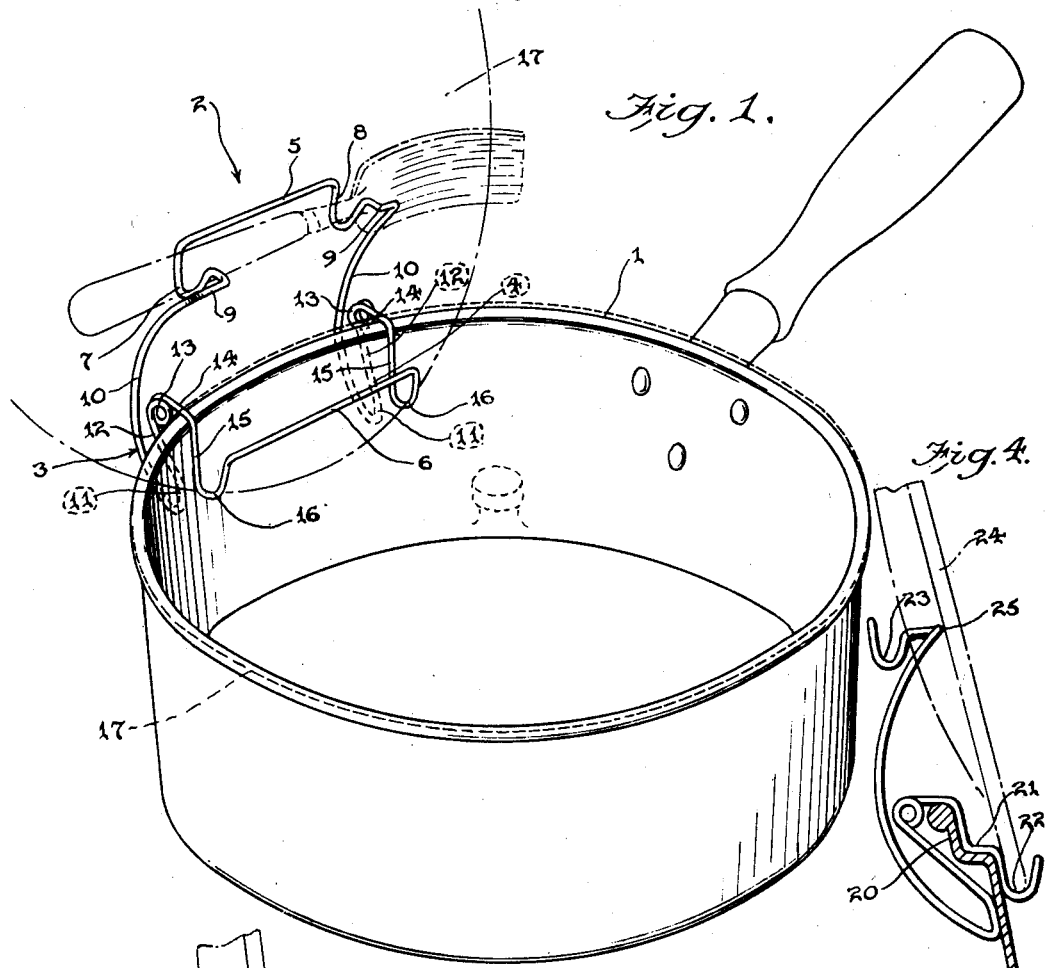
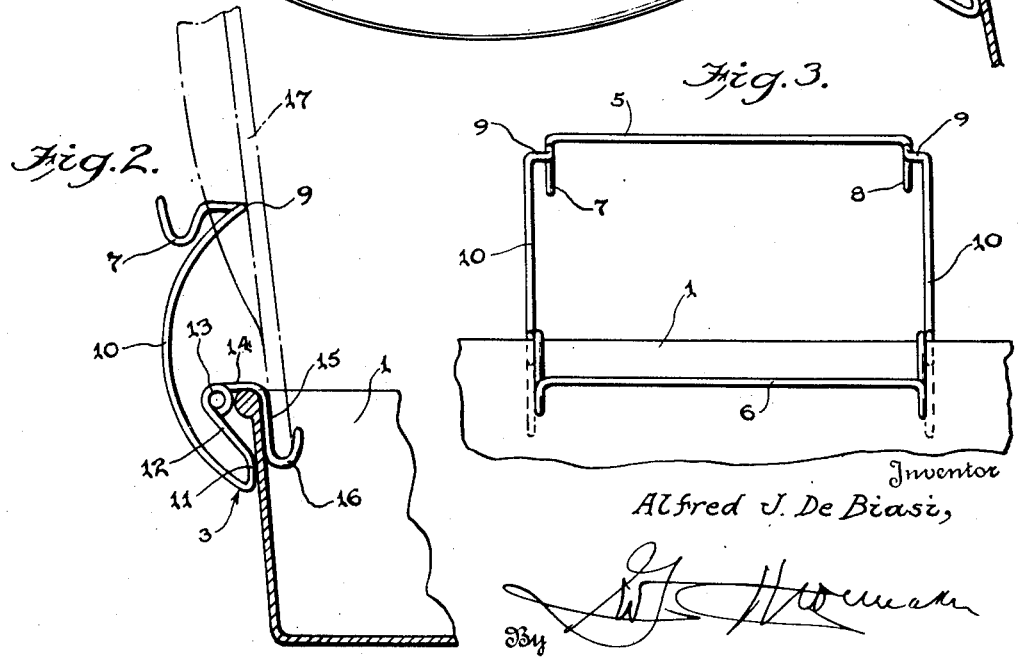
Inventor
Alfred J. De Biasi,
By
Attorney Patented Oct. 3, 1933

1,928,995

UNITED STATES PATENT OFFICE 1,928,995

COMBINED HOLDER FOR PAN COVERS AND OTHER CULINARY ARTICLES

Alfred John De Biasi, Richmond, Va.

Application May 24, 1932. Serial No. 613,293

5 Claims. (Cl. 53—8)

This invention relates to a combined holder for pan covers and other culinary articles.

In the culinary art it is customary to fry, boil and bake foods in pans, kettles and the like, and in most instances the pans, etc. are supplied with a separate cover or lid. It is necessary at intervals during the cooking operation to remove such covers or lids from the pans, etc. to determine whether or not the food therein has been properly cooked. In removing the lids or covers of the pans, they must be held by the person doing the cooking or placed on the stove or other support. It is also customary that the person cooking have in his hand a fork, spoon or other article with which the hot food is handled.

In the event the lid or cover for the pan, etc. be removed, and if it is placed on a portion of the stove as is usually done the condensed vapors on the lid will soil the stove, giving a very unsightly appearance thereto, regardless as to the amount of cleaning thereafter. This being due to the fact that various greases collect on the lid.

The present invention provides means for supporting the lid or cover so that the condensed vapors thereon will be returned to the inside of the pan, and not soil the stove. This invention also provides a support or rest for the fork, spoon, knife or other article with which the food within the pan, etc. is handled. In other words, the lid or cover for the pan and the article with which the food in the pan is handled are kept in close association with the pan, etc. and the condensed vapors are prevented from running on the stove and soiling the same.

One object of the invention is to provide a support or rest for the lid and the article with which the food is handled which is of simple design and construction, permitting manufacture at a very low cost, yet being durable and capable of long efficient service.

Another object of the invention is to provide a device of this character which may be applied to standard pans, etc. now purchasable on the market.

Another object of the invention is to provide a device of this character which will adapt itself to and conform to various sizes and shapes of pans, pots, kettles, etc.

A further object of the invention is to provide a device in which a lid or an article with which the food is to be handled may be supported or for supporting both the lid and the article for handling the food.

A still further object of the invention is to provide a device which when applied to the pot, pan, etc. will not interfere with placing or removing the lid or cover on or from the pot, pan, etc.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

The invention will be more readily understood by referring to the annexed drawing, wherein:—

Figure 1 is a perspective view of the holder attached to the side of a pan showing the cover on the pan in broken lines and supported in the holder in broken lines;

Fig. 2 is a side elevational view showing the pan in cross section with the holder attached thereto;

Fig. 3 is a front elevational view of the holder attached to the pan; and

Fig. 4 is a side elevational view showing a slight modification of the invention.

Referring more particularly to the drawing in detail by reference numerals the vessel or pan is indicated by the numeral 1. The holder indicated at 2 is preferably formed of a continuous piece of non-corrosive spring wire and consists of oppositely disposed vertically arranged spring jaws or clasps 3 and 4, respectively, and constituting part of what may be termed vertically and transversely extending end members or sections. These spring jaws or clasps are held in longitudinally spaced oppositely disposed relationship by means of horizontally and longitudinally extending upper and lower connecting portions, bars or sections 5 and 6, respectively. Each end of the upper longitudinally extending connecting portion or bar 5 is bent downwardly, thence forwardly and thence upwardly to form at each end of the connecting portion or bar 5 an upper outer bend or loop as 7 or 8 as the case may be. Each loop, as 7 or 8, terminates in an extension 9, which according to the construction of Fig. 1 extends forwardly thence in a longitudinal direction—longitudinally outwardly—to a main or major curved portion 10 the upper part of which major portion 10 is curved downwardly and rearwardly and the lower part of which portion 10 is curved downwardly and forwardly and has at the lower end thereof a section or portion which may be referred to as a rear bottom bent section that serves as a connection between the lower end of the main curved section on the one hand and the part 11 which may be considered as part of a rear clamping member or jaw of a clamping construction or clamp which is defined herein as comprising the jaws or clasps of the parts designated as 3 or 4. That portion 11 forming a part of the spring jaws is then retrorsely bent as at 12 and terminates into spring coils 13. The part 11 may be described as comprehending a portion or section which extends upwardly and rearwardly and constitutes a rear or outer clamping jaw proper. The part 15 extends downwardly and may be described as the forward or inner clamping jaw proper. These clamping jaws 12 and 15 are connected by a section providing the spring coil 13 and the horizontal section 14 whereby the desired resilient clamping effect is enabled to be realized.

From the drawing it will be seen that the wire from the coil 13 is extended horizontally and forwardly or inwardly as at 14 and is then bent downwardly as at 15 to provide the inner clamping jaw just mentioned and therefrom the wire extends inwardly and upwardly to form a loop as 16. These loops provide what may be termed as the lower front bends and are connected by the lower horizontally connecting portion or bar 6.

The coils 13 of the spring wire and the horizontal portions 14 connected thereto provide the spring construction that tend to urge the clamping jaw portions 15 and 11 toward one another and in effect form the oppositely disposed vertically arranged spring jaws 3 and 4, respectively. By referring to Fig. 2 it will be seen that the portions 15 of the wire engage the inner side of the pan and constitute one part of the spring jaws or clasps 3 and 4, respectively. The other part of the spring jaw or clamp is formed by the portion 11 which engages the outer side of the pan. In this manner of forming the holder and as clearly shown in the drawing the spring jaws or clasps 3 and 4 will tightly grasp the side of the pan to which the holder is applied and the portions 15, 16 and the horizontally disposed connecting portion 6 are all disposed within the pan. The remaining portions of the holder are either above or exteriorly of the pan. The loops 16 and the associated horizontally disposed connecting portion 6 and the portions 15 collectively form or define a lower inner rest or support for the lid denoted at 17 and the connecting portion 5 and the loops 7 and 8 collectively form or define a upper outer support or rest for a knife, fork, spoon or other article with which the material within the pan is handled. It will be noted that said upper outer support and also the upper supporting connecting bar 5 is substantially above or at a higher elevation than the clamping construction as provided by the clamping structures or clasps 3 and 4, and that the lower inner support and also the lower connecting bar 6 are substantially below or at a lower elevation than the top portion of the clamp or clasp structures 3 and 4.

It is to be understood that the holder is bent up or formed from a continuous piece of spring wire the ends of which may be connected in any suitable manner as by welding, soldering, or otherwise connected.

The opposite sides of the holder are identical in their formation, that is the vertically disposed spring jaws or clasps 3 and 4 are both formed in the same manner. The portions connecting the spring jaws are also formed identical with one another.

In the modification of the invention as shown in Fig. 4 the holder is shown applied to a pan having a flaring stepped outer edge 20. In this instance that portion of the wire 15 as disclosed in the remaining figures of the drawing is stepped or bent to conform to the shape of the stepped flared outer edge of the container as at 21 but in any event the part 21 has an extent in a general downward direction so as to provide a front or inner clamping body of the clamping or clasp structure. The loop for holding the pan lid is denoted at 22 and the loop for holding the knife, fork or other articles is denoted at 23. The parts of the invention as disclosed in Fig. 4 are formed identical with the invention as disclosed in the other figures of the drawing except for the formation of the portion 21 which enables it to conform to the shape of the vessel or pan to which it is applied. The lid or cover of the pan 24 is shown in broken lines in Fig. 4.

In the invention or its modification as disclosed in Fig. 4 it will be seen that when the lid rests in or is supported in the loops 16 and 22, respectively, it will assume an inclined position and a portion of the lid or cover will engage the lateral extensions 9 as shown in Figs. 1 to 3, and the lateral extensions 25 as shown in Fig. 4. The formation of the holder in all of its embodiments as shown will as before stated support the lid in an inclined position. The lid is supported within the pan or vessel and the condensed vapors therefor will run back into the pan or vessel and will not soil the stove.

In the present invention the lid or cover when not serving as a cover or lid for the pan will be supported in the rest in a vertically inclined position and the fork, spoon or other article with which the food within the pan is handled is supported in a horizontal position above the rest or support for the lid. Therefore, the lid of the pan and the article with which the food is handled are readily accessible to the person doing the cooking.

The holder while preferably constructed of spring wire may be formed from any suitable material, for instance sheet metal. In making the holder of spring wire, the holder is of sufficient rigidity to form a rest or support for the lid and the article with which the food is handled but it is flexible or resilient so that the holder can conform itself to the shape or configuration of the pan to which it is attached. It is understood that if the edge of the pan top is of irregular formation, the wire of the holder can be bent to accommodate various shapes of the upper edge of the pan. From the foregoing it is believed clear that the holder of the present invention is of simple and inexpensive design and construction and one which is durable and which will permit of long efficient service. When the holder is attached to the edge of the pan as shown in the drawing it will not interfere with placing the lid or cover of the pan thereon and will permit ready removal of the cover from the pan.

From the drawing it will be manifest that the holder comprises upper and lower longitudinally and horizontally extending bars as 5 and 6 and that at each end of the device there is employed what may be termed as the transversely extending end section. Each of these end sections comprise an upper U-shaped portion defined as by parts marked 7 and 8, these upper U-shaped portions are followed by what may be termed a main upper section or portion that extends downwardly and rearwardly, to-wit that portion which is defined by the upper portion of the member marked 10. Each end section also comprises what may be considered as a lower main portion and includes the sections which provide rear and forward clamping jaws as 12 and 15 and which may be described as resiliently or spring connected so that the front and rear clamping jaws can be relied upon to hold the device in place. In effect these clamping members extend upwardly and rearwardly and it will also be noted that at the lower portion of each of these end sections there is a U-shaped portion defined as by the parts marked 16 which extend from and between the front clamping jaw 15 on the one hand and an end of the lower horizontally extending bar 6 on the other.

What is claimed is:

1. A device of the class described composed of a single piece of a wire bent so as to provide a longitudinally and horizontally extending upper bar or section, a longitudinally and horizontally extending lower bar or section and transversely extending end sections, each of said end sections comprising in succession a downwardly extending portion connected to and leading from the upper bar, an upper bent portion which curves forwardly and upwardly, a forward portion, a downwardly extending major or main end portion, a rear bottom bent portion which curves forwardly and upwardly, a portion having a part that extends upwardly and rearwardly and that provides a rear clamping jaw, a spring coil portion, a portion having a downwardly extending part and that provides a front clamping jaw, and a lower inner bent portion that extends forwardly and upwardly to the lower longitudinally extending bar.

2. A device of the class described composed of a continuous piece of spring wire and constructed so as to provide a longitudinally extending upper connecting bar, a longitudinally extending lower connecting bar and vertically and transversely extending end sections that connect the ends of said upper and lower bars, each of which end sections comprises an upper, outer transversely extending bent portion, a main curved portion which extends downwardly, a lower rear transversely extending bent portion, an upwardly and rearwardly extending portion providing a rear or outer clamping jaw, a spring coil portion for connecting said rear or outer clamping jaw and a front or inner clamping jaw, a downwardly extending portion for providing said front or inner clamping jaw, and a lower inner transversely extending bent portion having a part that extends inwardly and upwardly to the longitudinally extending lower connecting bar.

3. A device of the class described formed of a continuous single piece of spring wire shaped so as to provide an upper, outer longitudinally extending bar section, a lower, inner longitudinally extending bar section, and vertically and transversely extending end sections, each of which end sections comprises in succession a downwardly extending portion constituting part of an upper outer bent portion which ultimately curves forwardly and upwardly, a longitudinally extending portion, a major or main curved portion the top part of which curves downwardly and rearwardly and the bottom part of which curves downwardly and inwardly, a rear lower bottom bent portion having a part which curves forwardly and upwardly, a rearwardly and upwardly inclined portion providing a rear clamping member, a spring coil portion constructed so as to provide a connecting section between the rear clamping member and a front clamping member, a downwardly extending portion constructed so as to provide the front or clamping member, and a forward lower inner bent portion having a part that extends forwardly and upwardly to the lower inner longitudinally extending bar, the arrangement being such that the upper longitudinally extending bar and the upper outer bent sections associated therewith are located at elevations substantially above the spring coils, also such that the lower longitudinally extending bar and the lower inner bent portions associated therewith are at elevations lower than that of the spring coils.

4. A device of the class described composed of a single piece of non-corrosive wire bent so as to provide a longitudinally and horizontally extending upper bar or section, a longitudinally and horizontally extending lower bar or section and transversely extending end sections, each of said end sections comprising in succession a downwardly extending portion leading from the upper longitudinally extending bar, an upper bent portion which curves forwardly and upwardly, a major or main curved portion the top part of which curves downwardly and rearwardly and the bottom part of which curves downwardly and forwardly, a rear bottom bent portion which curves forwardly and upwardly, a rear clamping jaw portion provided by a part in which a section thereof extends upwardly and rearwardly, a spring coil, a downwardly extending portion which provides a front clamping jaw or member, and a lower inner bent portion that extends forwardly and upwardly to the lower longitudinally extending bar, the arrangement being such that the upper longitudinally extending bar is located substantially above or at a higher elevation than the spring coils between the clamping jaws, the construction also being such that the lower longitudinally extending bar is located at an elevation which is intermediate said spring coil on the one hand and the lower extremity of the lower inner bent portions on the other.

5. A device of the class described comprising a single piece of wire bent to provide a longitudinally and horizontally extending upper bar or section, a longitudinally and horizontally extending lower bar or section and transversely extending end sections, each of said end sections comprising an upper U-shaped portion extending from the upper longitudinally extending bar, an upper main portion following said U-shaped portion and which upper main portion extends downwardly from said upper U-shaped portion, a lower main portion constructed so as to provide spring connected or resilient rear and front clamping jaw portions having upwardly extending clamping portions and a lower U-shaped portion that is provided at the lower end portion of the front clamping jaw and that extends between said front clamping jaw to an end of the lower horizontally extending bar.

ALFRED J. DE BIASI.